United States Patent
Zuo et al.

(10) Patent No.: US 10,788,984 B2
(45) Date of Patent: Sep. 29, 2020

(54) METHOD, DEVICE, AND SYSTEM FOR DISPLAYING USER INTERFACE

(71) Applicant: Alibaba Group Holding Limited, George Town, Grand Cayman (KY)

(72) Inventors: Jun Zuo, Hangzhou (CN); Haidong Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 42 days.

(21) Appl. No.: 15/148,697

(22) Filed: May 6, 2016

(65) Prior Publication Data

US 2016/0328602 A1 Nov. 10, 2016

(30) Foreign Application Priority Data

May 8, 2015 (CN) .......................... 2015 1 0233026

(51) Int. Cl.
| | |
|---|---|
| *G06F 3/00* | (2006.01) |
| *G06F 3/0489* | (2013.01) |
| *G06F 3/03* | (2006.01) |
| *G06F 3/01* | (2006.01) |
| *G06F 3/0484* | (2013.01) |
| *G06F 3/0488* | (2013.01) |
| *G06F 21/32* | (2013.01) |

(Continued)

(52) U.S. Cl.
CPC ............ *G06F 3/0489* (2013.01); *G06F 3/012* (2013.01); *G06F 3/0304* (2013.01); *G06F 3/0484* (2013.01); *G06F 3/0488* (2013.01); *G06F 21/31* (2013.01); *G06F 21/32* (2013.01); *G06F 21/57* (2013.01); *G06F 2221/031* (2013.01)

(58) Field of Classification Search
USPC ....................................................... 382/118
See application file for complete search history.

(56) References Cited

U.S. PATENT DOCUMENTS

| | | | |
|---|---|---|---|
| 8,646,060 B1 * | 2/2014 | Ben Ayed | H04L 63/0853 726/9 |
| 9,166,971 B1 | 10/2015 | Emigh | |
| 9,178,908 B2 | 11/2015 | Call et al. | |

(Continued)

FOREIGN PATENT DOCUMENTS

| | | | | |
|---|---|---|---|---|
| CN | 103793815 | 5/2014 | | |
| CN | 104125216 | 10/2014 | | |
| WO | WO2015116728 | * 8/2015 | ............. | G06Q 30/06 |

Primary Examiner — Jerome Grant, II

(57) ABSTRACT

Systems and methods for displaying a user interface are disclosed herein. The method includes starting a trusted application in a trusted execution environment, the trusted application having a trusted user interface, and displaying the trusted user interface upon detecting an input operation for a hardware device, where the hardware device is integrated into the trusted execution environment and configured to acquire external identification information. The hardware device is configured to acquire the external identification information that is preconfigured on a smart terminal device, for example, including a fingerprint sensor or a photographic device. The hardware device is used to verify that the user interface is true and trustworthy. Embodiments of the present invention are implemented without increasing the hardware costs thereof and without increasing the implementation complexity of the software.

16 Claims, 10 Drawing Sheets

(51) Int. Cl.
   *G06F 21/31*   (2013.01)
   *G06F 21/57*   (2013.01)

(56) References Cited

U.S. PATENT DOCUMENTS

| | | |
|---|---|---|
| 9,203,648 B2 | 12/2015 | Shraim et al. |
| 9,241,009 B1 | 1/2016 | Starnik et al. |
| 9,246,881 B2 | 1/2016 | Prot |
| 9,246,918 B2 | 1/2016 | Marshall et al. |
| 9,245,119 B2 | 2/2016 | Mahaffey et al. |
| 9,251,360 B2 | 2/2016 | Meyer et al. |
| 9,253,174 B1 | 2/2016 | Rowe |
| 9,253,176 B2 | 2/2016 | Ford et al. |
| 9,262,629 B2 | 2/2016 | Belani et al. |
| 9,262,638 B2 | 2/2016 | Nachenberg et al. |
| 9,264,399 B1 | 2/2016 | Schryver |
| 9,268,545 B2 | 2/2016 | Lortz et al. |
| 9,268,991 B2 | 2/2016 | Russo et al. |
| 9,269,028 B2 | 2/2016 | Kurzer et al. |
| 9,270,696 B2 | 2/2016 | Fritzson et al. |
| 9,270,699 B2 | 2/2016 | Milener et al. |
| 9,270,833 B2 | 2/2016 | Ballai et al. |
| 9,536,197 B1* | 1/2017 | Penilla .................. G06N 5/025 |
| 9,817,992 B1* | 11/2017 | Paczkowski ........ G06F 12/1416 |
| 9,977,887 B2* | 5/2018 | Bengtsson .......... G06F 21/6218 |
| 2002/0003892 A1 | 1/2002 | Iwanaga |
| 2005/0138356 A1* | 6/2005 | Hurwitz ................ H04L 63/104 713/155 |
| 2011/0138481 A1* | 6/2011 | Lee .................... G06K 9/00013 726/28 |
| 2012/0054841 A1* | 3/2012 | Schultz ................... G06F 21/44 726/6 |
| 2012/0075229 A1* | 3/2012 | Summers ................ G06F 3/044 345/173 |
| 2012/0297469 A1* | 11/2012 | Reeder .................. H04L 9/3297 726/7 |
| 2013/0038426 A1* | 2/2013 | Yamada ............. G06K 9/00926 340/5.82 |
| 2013/0321284 A1* | 12/2013 | Bello ...................... A61B 6/548 345/173 |
| 2013/0333008 A1* | 12/2013 | Tapling ................... H04L 63/04 726/7 |
| 2013/0340060 A1* | 12/2013 | DiRico .................. H04L 63/08 726/7 |
| 2013/0347097 A1* | 12/2013 | Pan ......................... G06F 21/31 726/17 |
| 2014/0059673 A1 | 2/2014 | Azar et al. |
| 2014/0245013 A1* | 8/2014 | Kim ....................... H04L 63/10 713/171 |
| 2014/0289790 A1 | 9/2014 | Wilson |
| 2014/0289833 A1 | 9/2014 | Briceno et al. |
| 2015/0006376 A1* | 1/2015 | Nuthulapati .......... G06Q 20/341 705/41 |
| 2015/0121068 A1 | 4/2015 | Lindermann et al. |
| 2015/0269565 A1* | 9/2015 | Inotay .................. G06Q 20/354 235/380 |
| 2015/0312265 A1 | 10/2015 | Hu |
| 2015/0326615 A1 | 11/2015 | Sinha |
| 2015/0381654 A1 | 12/2015 | Wang et al. |
| 2016/0056962 A1 | 2/2016 | Mehtala |
| 2016/0057167 A1 | 2/2016 | Bach |
| 2016/0098550 A1* | 4/2016 | Lam ....................... G06F 21/32 726/18 |
| 2016/0259934 A1* | 9/2016 | Rozenberg .............. G06F 21/44 |
| 2017/0143282 A1* | 5/2017 | Kovacs ................. A61B 5/7495 |
| 2017/0195124 A1* | 7/2017 | Obaidi .................. H04L 9/3263 |
| 2017/0244729 A1* | 8/2017 | Fahrny ................ H04L 63/0823 |
| 2017/0262625 A1* | 9/2017 | Takeda .................... G06F 21/40 |
| 2017/0289185 A1* | 10/2017 | Mandyam ........... H04L 63/1425 |
| 2017/0293410 A1* | 10/2017 | Kulchytskyy ......... G06F 3/0487 |
| 2018/0082085 A1* | 3/2018 | Yau ......................... G06F 21/577 |
| 2018/0219893 A1* | 8/2018 | Li ........................ H04L 63/1425 |
| 2018/0357418 A1* | 12/2018 | Li ............................ H04W 8/18 |

\* cited by examiner

METHOD, DEVICE, AND SYSTEM FOR DISPLAYING USER INTERFACE

CROSS-REFERENCE TO RELATED APPLICATIONS

This application claims priority to Chinese Patent Application No 201510233026.5, filed on May 8, 2015, which is incorporated herein by reference in its entirety for all purposes.

FIELD OF THE INVENTION

The present application relates to user interface technologies and, more specifically, to a method, device, and system for displaying as trusted user interface.

BACKGROUND OF THE INVENTION

When using modern smart terminal devices (e.g., smartphones and tablet computers), users may download various applications via various channels to enhance their smart terminal devices. When downloading new applications, some viruses or other malicious programs/code may use the opportunity to enter and infect the smart terminal device. When a user performs a sensitive operation, such as making a mobile payment, these viruses or malicious programs/code may snoop and intercept the user's private or sensitive information (e.g., financial information, passwords, and the like), which can cause great economic or personal loss to the user.

To protect against such attacks, Global Platform (GP) has proposed a trusted execution environment (TEE). The TEE is a secure region in smart terminal devices, such as a smartphone, a tablet computer, which ensures that sensitive data is stored, processed, and protected in a trusted environment, and provides a secure execution environment for authorized secure software (e.g., a trusted application (TA)). A client, application (CA) running in a rich OS execution environment (REE) like Android may download the portion to be protected on the TEE side for execution. Furthermore, a security extension mechanism based on an ARM Trust-Zone architecture may be an implemented in the trusted execution environment.

The trusted execution environment is subjected to various application scenarios. One of the application scenarios is a trusted user interface (TUI), where a user interface is displayed in the trusted execution environment and interactions with the user may be achieved via the user interface. For example, for a sensitive operation like inputting a payment password, because the trusted execution environment has a higher security level, the malicious program running on the REE side fails to snoop or intercept the key information (e.g., a user password). Therefore, security protection for these sensitive operations plays a very important role.

In some cases, malicious software may surreptitiously present a false user interface to the user, and sensitive information of the user may be acquired via phishing using the false interface. To ensure that the currently displayed user interface is an authorized TUI rather than a false TUI surreptitiously presented by a malicious program, the GP provides the following two solutions:

1) A dedicated LED notification light 110 serving as a security indicator is included in the terminal device. An exemplary PIN code input interface 105 is illustrated in FIG. 1 according to embodiments of the present invention. Since the LED notification light 110 may only be controlled by the trusted execution environment, the malicious program is unable to access and control (e.g., turn on or off) the LED notification light 110. If the LED notification light 110 is on, it indicates to the user that the currently displayed TUI is true and trustworthy.

2) Some information (e.g., images and texts) are stored in the secure execution environment. An application running on the REE may fail to access such information. Therefore, if the currently displayed TUI is able to correctly display the stored information, the currently displayed TUI is verified to be true and trustworthy.

Although the TUI may be verified as trustworthy using the above two solutions, there are still defects in the processes. For example, the newly included hardware LED notification light or independent storage space greatly impacts the design structure of relatively mature smart terminal devices. For this reason, not only are hardware costs increased, but the overall design complexity is also increased.

SUMMARY OF THE INVENTION

Embodiments of the present application describe systems and methods for displaying a user interface are disclosed herein. The mechanism disclosed herein is intended to solve the problems in the existing technologies of verifying TUIs which typically are implemented using dedicated hardware. Such hardware demand increased manufacturing and material cost and design complication.

According to one described embodiment, a method for displaying a user interface is disclosed. The method includes initiating a trusted application in a trusted execution environment, displaying the trusted user interface included in the trusted application upon detecting an input operation from a hardware device, acquiring external identification information using the hardware device, and comparing the external identification information to pre-stored identification information to verify the trusted user interface, were the hardware device operates in the trusted execution environment, and the trusted user interface is not displayed when the trusted user interface is not verified.

According to another embodiment, an apparatus for displaying a user interface is disclosed. The apparatus includes a trusted application starting unit configured to initiate a trusted application in a trusted execution environment, the trusted application having a trusted user interface, an input operation detecting unit configured to detect, in the trusted application, an input operation of a hardware device, were the hardware device is integrated into the trusted execution environment and configured to acquire external identification information, and a user interface displaying unit configured to display, the trusted user interface of the trusted application when the operation is detected by the input operation detecting unit.

BRIEF DESCRIPTION OF THE DRAWINGS

The accompanying drawings, which are incorporated in and form a part of this specification, and in which like numerals depict like elements, illustrate embodiments of the present disclosure and together with the description, serve to explain the principles of the disclosure.

DETAILED DESCRIPTION

Figure 1:
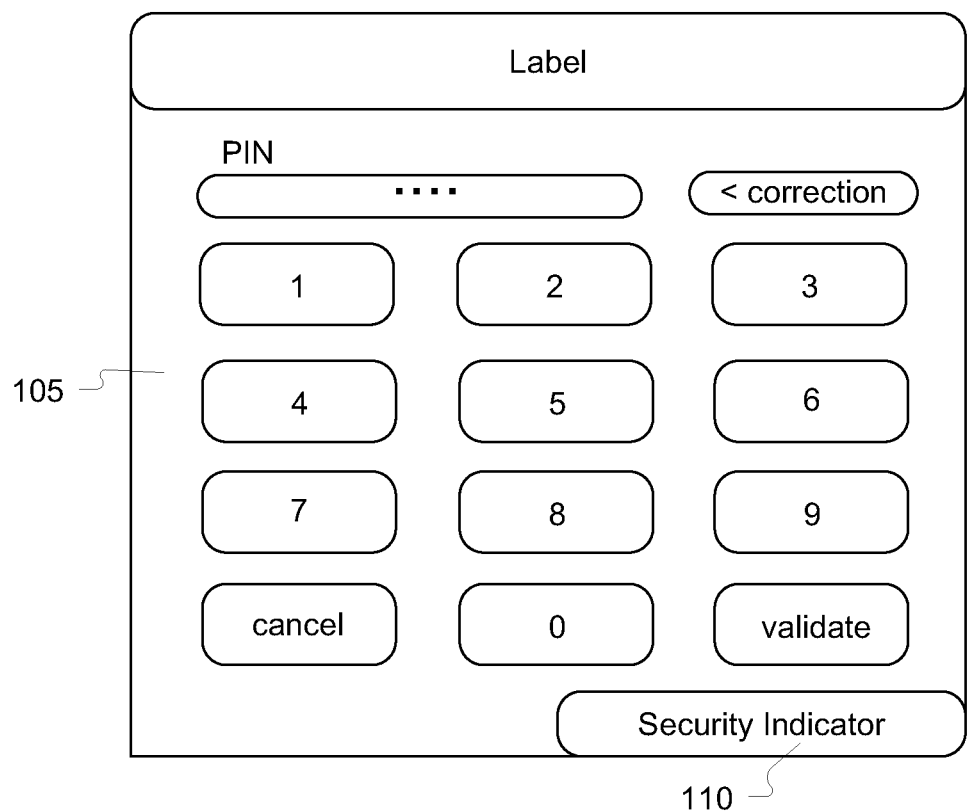
FIG. 1 is a diagram illustrating an exemplary PIN code input interface according to embodiments of the present invention.

Details are given in the following description for better understanding of the present application. However, the present application may be implemented in a plurality of embodiments different from those described herein, and a person skilled in the art may make similar derivations without departing from the essence of the present application. Therefore, the present application is not subjected to limitations of the specific embodiments disclosed hereinafter.

In the present application, a method for displaying a user interface, a device for displaying a user interface, and a system for displaying a user interface are disclosed and described in detail in the embodiments hereinafter. For ease of understanding, first, the basic concepts and principles involved in the technical solutions of the present application are briefly described.

To ensure the security of sensitive applications (e.g., a mobile payment application), a trusted execution environment (TEE) is used for smart terminal devices. The TEE is an independent execution environment that runs in parallel to the rich OS execution environment (REE) and provides security services for the REE. The TEE implements access isolation and software and hardware resource protection to ensure that sensitive data is stored, processed, and protected in a trusted environment, and provides a secure execution environment for authorized secure software (e.g., trusted applications). For example, with respect to a trusted user interface (TUI), since the fingerprint sensor, the touch screen, the display screen, the keyboard, and like peripheral devices are isolated on the REE side, the device can safely acquire a password or personal identification number (PIN) of the user.

The system architecture for implementing the TEE generally involves two portions. One is a common execution environment, and the other is a trusted execution environment. A client application (CA) runs on the REE side, and a trusted application (TA) runs on the TEE side. The CA communicates with a TA on the TEE side via a TEE client API on the REE side and uses the services provided by the TEE. The TA securely runs on the TEE side and uses a TEE internal API to acquire access rights for the secure resources and services. In this way, key management, key storage, data secure storage, encrypted operation, and similar high security operations are performed. In this way, isolation and security is implemented for hardware and software resources.

According to some embodiments, the Intel trusted execution technology or the ARM TrustZone security extension mechanism may be used to provide a TEE execution environment. Security of the TrustZone security extension mechanism is achieved by isolating the hardware resources and the software resources of the on-chip system. In this way, the hardware resources and the software resources may be present in two environments, a secure environment (which corresponds to the trusted execution environment in the GP) and a normal environment (which corresponds to the rich OS execution environment in the GP). In hardware logic having the TrustZone function, specific bus technology and corresponding controller settings may be used to ensure that when performing a specific operation that requires security protection, the secure environment handles the system's sensitive resources (e.g., the touch screen, the display screen, the fingerprint sensor, and the like). In this way, it is ensured that these resources cannot be accessed by a component (for example, an application) in the normal world. Even if the malicious program acquires the highest level access privilege (e.g., the root privilege in Linux), the resources in the secure world may not be accessed.

When typical ARM cores implement the TrustZone security mechanism, the processor cores are generally configured as two virtual cores. One virtual core is used for running the secure environment, and the other is used for running the normal environment. In addition, a mechanism for environment context switching, which is referred to as a monitor mode, is included.

According to embodiments of the present invention, a trusted application is started in the TEE, and a trusted user interface is displayed when an input operation of the hardware device is detected, where the hardware device is integrated on the TEE side and configured to acquire external information of the user. In this way, the trusted user interface is verified as a true and trustworthy TUI. The hardware device is integrated in the TEE and configured to acquire the external information. After the TA (the application, that is taken over by the TEE) is started in the TEE, the REE fails to be accessed by the hardware device. The hardware device is configured to acquire the external information (e.g., a fingerprint sensor or photographic device configured to acquire human body biological feature).

Although the OP implements the TEE concept with respect to a smart terminal device, embodiments of the present application are not limited to implementation on a smart terminal device. Any electronic device having an execution environment partitioned into a TEE and a REE, and a software and hardware resource isolation function, may be used to implement embodiments of present application, and thereby improve device security.

Some embodiments of the present invention use a fingerprint sensor as an exemplary means of detecting user input. In addition, some embodiments use a trusted execution environment based on the ARM TrustZone system architecture, According to other embodiments, other means of implementing a trusted execution environment may be used, which are not limited in the present application.

Figure 2:
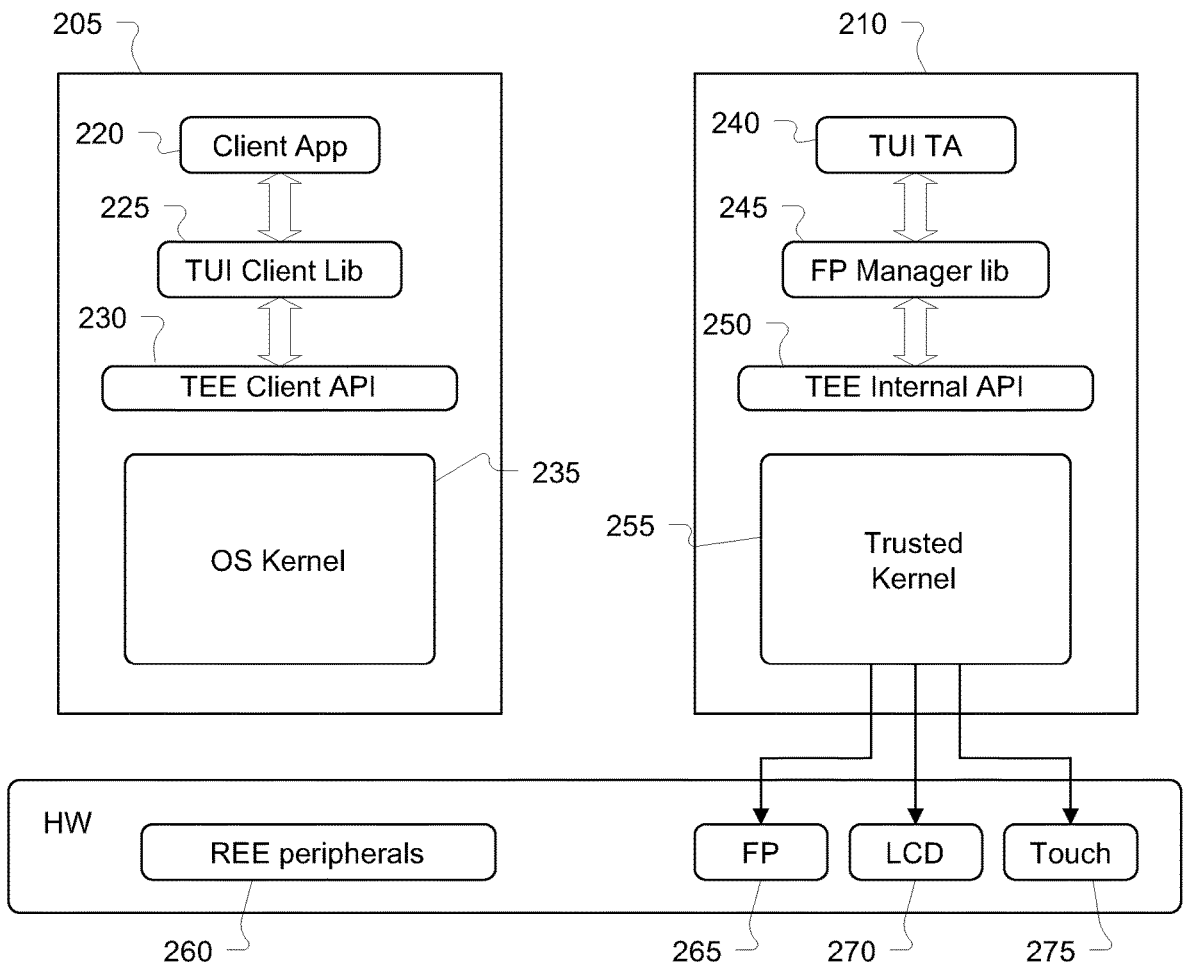
FIG. 2 is a block, diagram illustrating exemplary operating environments for displaying, a secure user interface according to embodiments of the present invention.

Referring to FIG. 2, a block diagram illustrating an exemplary user interface apparatus is depicted according to embodiments of the present invention. The REE 205 comprises:

1) Client App 220: a client application, for example, a mobile payment application such as Alipay.

2) TUI Client lib 225: a library of a TA including the TUI on the REE side, which provides operations such as downloading the TA to the TEE kernel 255, creating a session with the TA 240, sending a command and the like.

3) TEE client API 230: a standard TEE client interface provided by the GP.

4) OS kernel 235: a system kernel, for example, a Linux kernel.

The TEE side comprises:

1) TUI TA 240: a TA having a TUX function.

2) FP manager lib 345: a library of a fingerprint on the TEE side, which acquires and compares fingerprints for the TUI TA 240.

3) TEE internal API 250: a standard TEE internal interface provided by the GP.

4) Trusted kernel 255: a kernel of a Trust Zone system.

The peripheral devices integrated on the TEE side include a fingerprint sensor 265 (FP), a display device 270 (e.g., an LCD), and a touch screen 275. After the TA 240 is started in the TEE, these hardware devices may only be controlled or accessed by the TEE side, meaning the applications on the REE side (e.g., REE peripherals 260) are unable to access these peripheral devices. This is a basic feature of the TEE and is enabled by the TrustZone technology, according to some embodiments.

Figure 3:
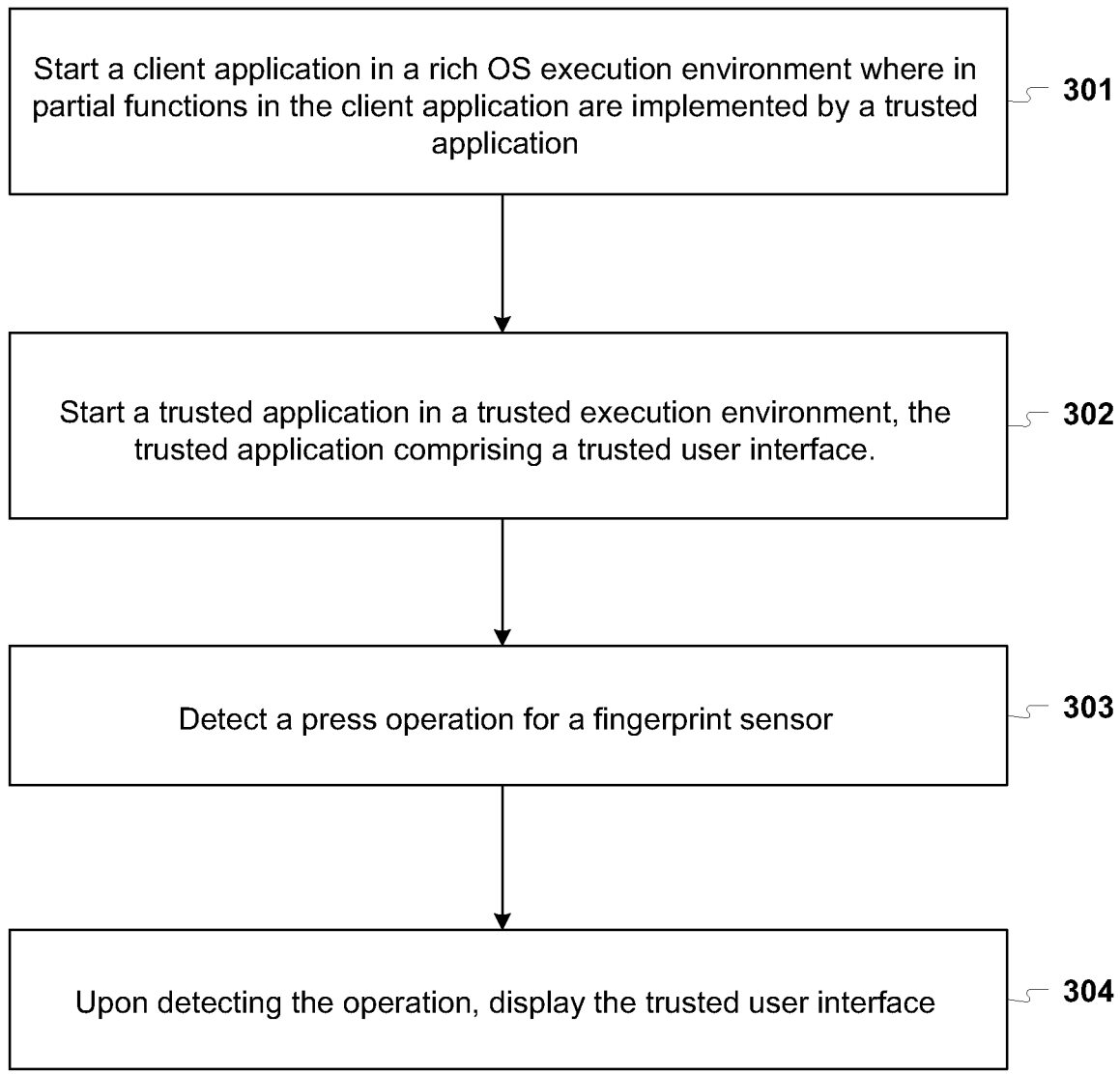
FIG. 3 is a flowchart illustrating an exemplary sequence of computer-implemented steps for performing a method for displaying a trusted user interface according to embodiments of the present invention.

With regard to FIG. 3, a flowchart illustrating an exemplary sequence of computer implemented steps for executing a method for displaying a user interface is depicted according to embodiments of the present invention. The method includes the following steps:

In step 301, a client application is started in an REE, where some functions or parts of functions in the client application are implemented by the TA.

For some applications, all of the functions thereof may be implemented on the TEE side. Under such circumstance, each time step 302 is performed to directly start the TA in the TEE, the started TA is responsible for performing the subsequent steps of detecting and displaying a trusted user interface. However, for the majority of applications, partial functions imposing no security requirement may be implemented on the REE side, and partial functions imposing security requirements may be implemented on the TEE side in the form of the TA. The application is generally referred to as a client application (CA). Under such circumstance, the CA may be started in the REE, and when the functions imposing security requirements are implemented, step 302 is performed to start the corresponding TA on the TEE side.

According to one exemplary embodiment, the client application is a payment application. In this step, the payment application may be started in the REE. When the payment application requires the user to input a PIN code, to ensure the security of this operation, step 302 may be performed to start the TA in the TEE for the user to input, the PIN code.

In step 302, the TA is initiated in the TEE.

At this time, a TA for implementing security restrictions may be initiated in the TEE.

According to some embodiments, the TA comprises a trusted user interface (e.g., the TA includes the TUI function). Subsequent steps of this method may be used to verify that the displayed user interface is a true and trusted TUI.

When the TEE is provided based on the TrustZone security extension mechanism, the process of starting the TA in the TEE is generally triggered by the client application. For example, the client application may download the TA to the TEE and create a trusted session with the TA.

Each TA should have at least one externally opened command ID, with each command ID providing a service function corresponding to the TA. The client application may establish a connection/relationship with a TA instance by opening the trusted session with the TA and invoking a command externally provided by the TA. For example, the client application may invoke the corresponding function provided by the TA via the command ID after the corresponding session with the TA is opened via a TEE client API interface, such that a client application running in a normal environment may use the security service function provided by the TA.

According to some embodiments, the payment application downloads the TA having the TUI function to the TEE side by invoking a StartAp( ) function in the TUI client lib provided by the Qualcomm platform and creates a session with the TA, Using the TEE client API, the function library is further encapsulated. According to other embodiments, this function may be implemented by directly invoking a TEEC_OpenSession( ) function provided by the TEE client API.

In step 303, the TA detects a finger press using a fingerprint sensor.

When the TEE is implemented using TrustZone technology, after a session is created between the client application on the REE side and the TA on the TEE side, the corresponding functions provided by the TA may be invoked by sending a command. For example, according to some embodiments, the payment application may invoke the corresponding function provided by the TA by invoking a TEEC_InvokeCommand( ) function provided by the TEE client API for displaying the user interface that enables the user to input the PIN code. To verify to the user that the displayed user interface is a true and trustworthy TUI, the TA first detects a user's finger press on the fingerprint sensor before displaying the trusted user interface, and displays the trusted user interface after detecting the operation.

During specific implementation, the user may be prompted to press his or her finger on the fingerprint sensor, and the user's press action for the fingerprint sensor is detected by invoking the corresponding interface downloaded to the TEE side and provided by a library corresponding to the fingerprint sensor, for example, by invoking the fp_detect( ) interface function provided by the FE manager lib. Further, if the press action is detected, an effective press area may be further acquired, and when the effective press area is greater than a predetermined threshold, the effective press action by the user for the fingerprint sensor is considered to have been detected, thereby preventing misjudgment.

Still with regard to step 303, according to some embodiments, a timeout detection mechanism is included. Specifically, if an effective finger press is detected within a predetermined time period, the subsequent step 304 of displaying the trusted user interface is performed; otherwise, step 304 is not performed and a corresponding notification is presented to the user. If no finger press has been detected within the predetermined time period, a timeout notification is presented to the user. If a finger press has been detected, but the effective touch area thereof is insufficient (e.g., is not greater than a predetermined threshold), the user is notified that no effective/valid finger press has been detected.

The TA may also display the trusted user interface before detecting a finger press. The displayed user interface has not been verified as true and trustworthy, so the input function of the trusted user interface may be disabled, as described in greater detail below with reference FIGS. 7-9. Specifically, if the displayed interface is configured to receive key information from the user using the touch screen, (e.g., account, password, etc.) the touch input function of the touch screen is disabled. If the displayed interface is configured to receive key information via a keyboard, for example, the keyboard put function is disabled. After an input operation is detected by the fingerprint sensor in this step, the input, function of the trusted user interface is enabled.

In step 304, the trusted user interface of the TA is displayed after detecting a valid touch input using the fingerprint sensor. After the TA completes the detection operation in step 303, the TA displays the trusted user interface. For example, according to some embodiments, the TA started by a payment application may display a trusted user interface or the user to input a PIN code after detecting the finger press for the fingerprint sensor. In the embodiments in which the TA has displayed trusted user interface that is in a disabled state before the finger press is detected, the input function of the interface may be enabled because a trusted user interface is displayed. The user is allowed to input desired information in the enabled/trusted user interface by using a peripheral device, such as a touch screen or a keyboard. This process is described in greater detail below with reference to FIGS. 7-9.s After the finger press is detected by the fingerprint sensor, the TA may further determine whether a fingerprint image acquired by the fingerprint sensor is consistent with a pre-stored fingerprint image, or determine whether a fingerprint feature value extracted from the fingerprint image is consistent with a pre-stored fingerprint feature value. If the images or the feature values are consistent, the trusted user interface is displayed. The pre-stored fingerprint image or fingerprint feature value is generally imported by the user in advance and may be stored in a secure region on the TEE side, or may be stored in a file system on the REE side after TEE encryption.

The TA may acquire a fingerprint image of the finger press by invoking a corresponding interface downloaded to the TEE side and provided by a library corresponding to the fingerprint sensor, and extract a fingerprint feature value from the fingerprint image. Alternatively, the TA may directly acquire a fingerprint feature value using an interface function and make a comparison with the pre-stored corresponding information. For example, the TA may directly acquire a fingerprint feature value by invoking a fp_get_template( ) interface function provided by a FP manager lib, invoke a fp_match( ) interface function provided by the library using the acquired fingerprint feature value, the pre-stored fingerprint feature value, and make a comparison of the fingerprint feature values. Some libraries may further provide an interface function for comparing the acquired fingerprint image with the pre-stored fingerprint feature value. In practical application, a suitable method for comparing the fingerprint image with the pre-stored fingerprint feature value may be selected according to the library functions and specific application, requirements of the fingerprint sensor.

In this step, the comparison operation may be performed for the fingerprint images (or the fingerprint feature values) by using the above manner, and the trusted user interface may be displayed when the comparison result is correct, that is, the fingerprint images or the fingerprint feature values are consistent.

After the TA is started in the TEE, the fingerprint sensor, the display, and the touch screen are managed by the TEE, which is secured using the TrustZone technology. The interactive operations related to the fingerprint sensor are performed by invoking the corresponding interface function provided by the FP manager lib, and interacting with a lower layer of the TEE internal API. The interactive operations may include detecting a finger press, acquiring a fingerprint image (or a fingerprint feature value), and comparing/analyzing the fingerprint image (or the fingerprint feature value). The interactive operations related to the fingerprint are performed on the TEE side. Therefore, after detecting the finger press by the user using the fingerprint sensor, the TA displays the trusted user interface, or displays/enables the input function of the interface. A program on the REE side may not be false or malicious, such and it is verified to the user that the user interface displayed after the finger press is detected is a true and trustworthy TUI, rather than a phishing interface or a counterfeit/malicious interface. Security protection is implemented at the hardware level, and the user is able to securely input key information (e.g., an account, password, etc.) in the user interface without danger of data interception.

The trusted user interface may be displayed after the finger press is detected, or the trusted user interface may be displayed upon a successful fingerprint comparison. These techniques verify to the user that the displayed user interface is a true and trusted TUI, rather than a counterfeit or false interface. Other techniques may be used to both verify to the user that the user interface is a true and trustworthy TUI, and provide identification verification for the user of the TUI, thereby providing more additional security. If the fingerprint comparison determines that the currently acquired fingerprint image (or the fingerprint feature value) is inconsistent with the pre-stored corresponding information, information indicating incorrect user fingerprint information may be presented to the user, and the trusted user interface is not displayed.

The trusted user interface may comprise a key information input interface. The key information interface is configured to receive key information input by the user that should be protected, such as account information, password information, and the like. For example, a PIN code input interface may be used. The trusted user interface may further comprise a key information display interface, for example, that displays a payment amount. The key information display interface may be displayed after a finger press on the fingerprint sensor is detected (or fingerprint comparison is successfully made). It is thereby verified to the user that the user interface is a true and trustworthy TUI, and the information displayed on the user interface is true and unaltered.

According to some embodiments, the TA may detect an input operation from a hardware device configured to acquire the external information, other than the fingerprint sensor. For example, the TA may acquire an iris or face image captured by a photographic device by invoking a corresponding interface downloaded to the TEE side and provided by a library associated with the photographic device before displaying the trusted user interface. The TA may also further determine whether the image is consistent with a pre-stored corresponding image or determine whether a feature value extracted from the image is consistent with a pre-stored corresponding feature value of the captured iris or face image. When the images or the feature values are consistent, the trusted user interface is displayed. As long as the hardware device is integrated on the TEE side, the application on the REE cannot be accessed by the hardware device.

In many cases, after a trusted application detects an input operation for a hardware device configured to acquire external information, a trusted user interface is displayed. Because the hardware device is integrated on the TEE side, and the operations such as detection and comparison of the input information of the hardware device are performed on the TEE side, the hardware device therefore can be considered a trusted hardware device. By using this hardware device, it may be further verified to the user that the displayed user interface is a true and trustworthy TUI, which implements hardware-level protection by establishing a trusted hardware link. According to some embodiments of the present application, a hardware device configured to acquire the external information is preconfigured on a smart terminal device, for example, a fingerprint sensor or a photographic device. The user interface is verified to the user as true and trustworthy without increasing the hardware cost (there is no need to add a dedicated LED notification light or dedicated storage space) or increasing the complexity of software.

Figure 4:
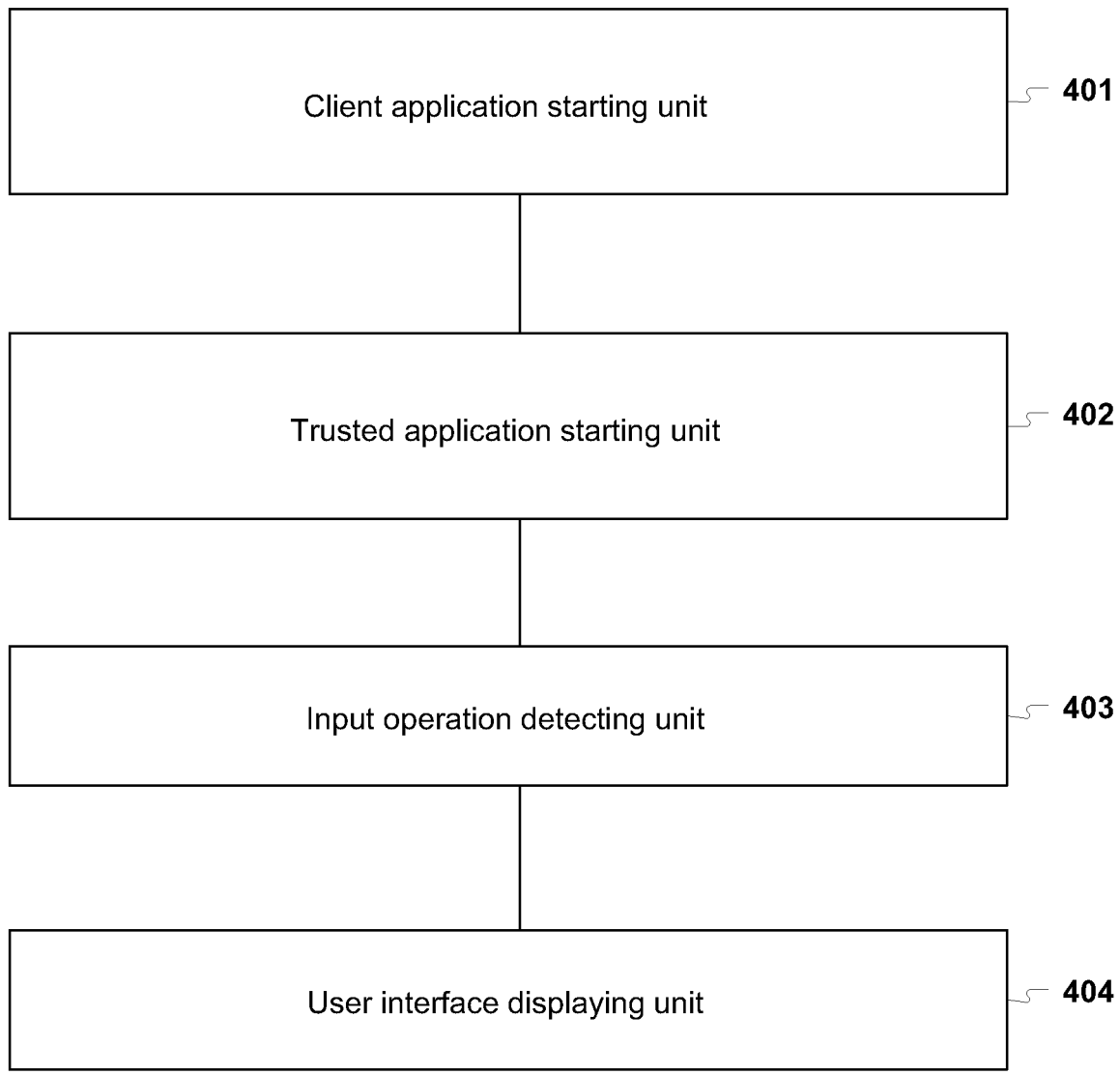
FIG. 4 is a block diagram illustrating an exemplary device for displaying a trusted user interface according to embodiments of the present invention.

Referring to FIG. 4, a schematic diagram illustrating an exemplary device for displaying a user interface is depicted according to embodiments of the present invention. The device described includes aspects that are substantially similar to the exemplary methods described herein. A brief description of the hardware device is given, although the device will be well-understood in light of the exemplary methods described herein. The exemplary device described hereinafter is merely illustrative, rather than limitative.

Still with regard to FIG. 4, the exemplary device for displaying a user interface includes: a client application starting unit 401, configured to start a client application in a rich OS execution environment, where the client application triggers execution of a trusted application and for example the unit 401 is operable to perform step 301 as described above; trusted application starting unit 402, configured to start a trusted application in a trusted execution environment, where the trusted application comprises a trusted user interface, and for example the unit 402 is operable to perform step 302 as described above; input operation detecting unit 403, configured to detect, in the trusted application, an input operation for a hardware device, where the hardware device is integrated into the trusted execution environment and configured to acquire external information, and for example the unit 403 is operable to perform step 303 as described above; and user interface displaying unit 404, configured to display, the trusted user interface of the trusted application, when an operation is detected by the input operation detecting unit, and for example the unit 404 is operable to perform step 304 as described above.

According to some embodiments, the hardware device configured to acquire external information that is detected by the input operation detecting unit comprises a fingerprint sensor or a photographic device. When the hardware device configured to acquire the external information includes a fingerprint sensor, the input operation detecting unit is specifically configured to detect a finger press on the fingerprint sensor as described in greater detail above with reference to Step 303.

According to some embodiments of the present invention, a fingerprint comparing unit is configured to determine whether a fingerprint image acquired by the fingerprint sensor is consistent with a pre-stored fingerprint image, or whether a fingerprint feature value extracted from the fingerprint image is consistent with a pre-stored fingerprint feature value. If the images or the feature values are consistent, the fingerprint comparing unit is configured to activate the user interface displaying unit as described in greater detail above with reference to Step 304.

According to some embodiments, when the hardware device configured to acquire the external information is a photographic device, the input operation detecting unit is specifically configured to detect an iris or face image captured by the photographic device. The hardware device comprises an iris or face comparing unit. The iris or face comparing unit is configured to determine, in the trusted application, after the input operation detecting unit acquires the iris or face image captured by the photographic device, whether the iris or face image is consistent with a pre-stored image or determine whether a feature value extracted from the iris or face image is consistent with a pre-stored feature value. If the images or the feature values are consistent, the iris or face comparing unit is configured to trigger the user interface displaying unit to work as described in greater detail above with respect to acquiring the iris or face image captured by using a photographic device.

According to some embodiments, the input operation detecting unit is specifically configured to detect the input operation for the hardware device by invoking a corresponding interface provided by a library corresponding to the hardware device in the trusted execution environment.

According to some embodiments, the trusted user interface of the trusted application started by the trusted application comprises a key information display interface or a key information input interface. Then the trusted user interface includes a key information display interface, the device further comprises the following interface displaying and input disabling unit captured to, before triggering the input operation detecting unit to work, display, in the trusted application, the key information input interface, and disable an input function of the interface. The user interface displaying unit is configure display the key information input interface of the trusted use interface and enable the input function of the interface.

According to some embodiments, the interface displaying unit and input disabling unit are specifically configured to disable the input function of the interface based on the following: if the interface receives an input via a touch screen, a touch input function of the touch screen is closed; if the interface receives an input via a keyboard, a keyboard input function is closed.

According to some embodiments, information which the key information input interface displays using the user interface displaying unit prompts a user to input account information and/or password information.

According to some embodiments, the trusted application starting unit is configured to start the trusted application in a secure execution environment using an ARM TrustZone architecture.

According to some embodiments, the client application started by the client application starting unit comprises a payment application. The trusted user interface displayed by the user interlace displaying unit comprises a personal identification number input interface.

Figure 5:
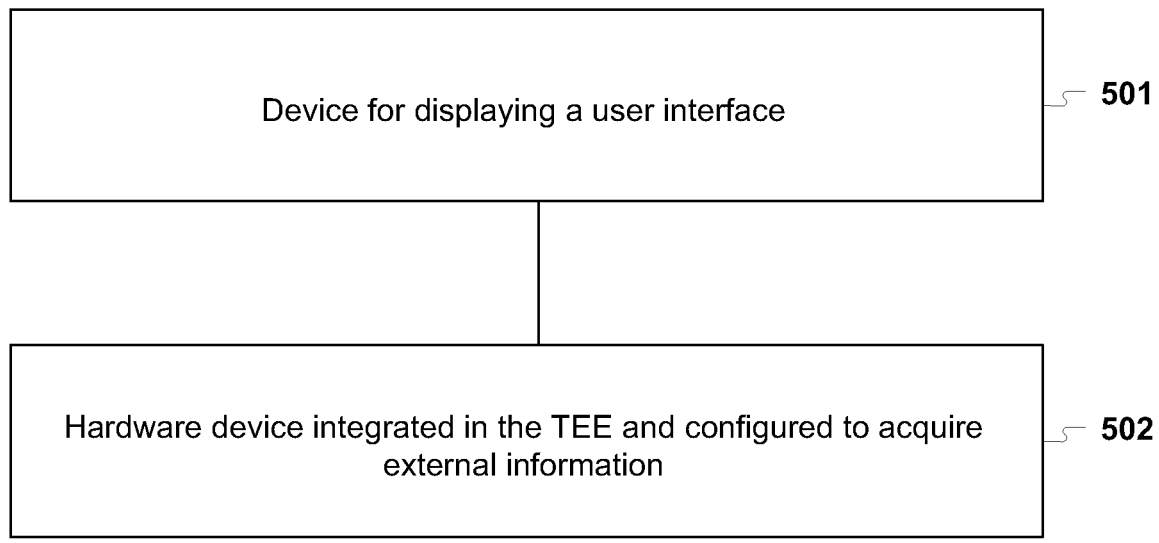
FIG. 5 is a block diagram illustrating an exemplary system for displaying a user interface according to embodiments of the present invention.

With regard to FIG. 5, an exemplary device 501 for displaying a user interface, and an exemplary hardware device 502 integrated in a trusted execution environment and configured to acquire external information, are depicted according to embodiments of the present invention. The device for displaying a user interface is configured to start a trusted application having a trusted user interface in the trusted execution environment, wherein the trusted application displays the trusted user interface when detecting an input operation for the hardware device integrated in the trusted execution environment and configured to acquire the external information.

Figure 6:
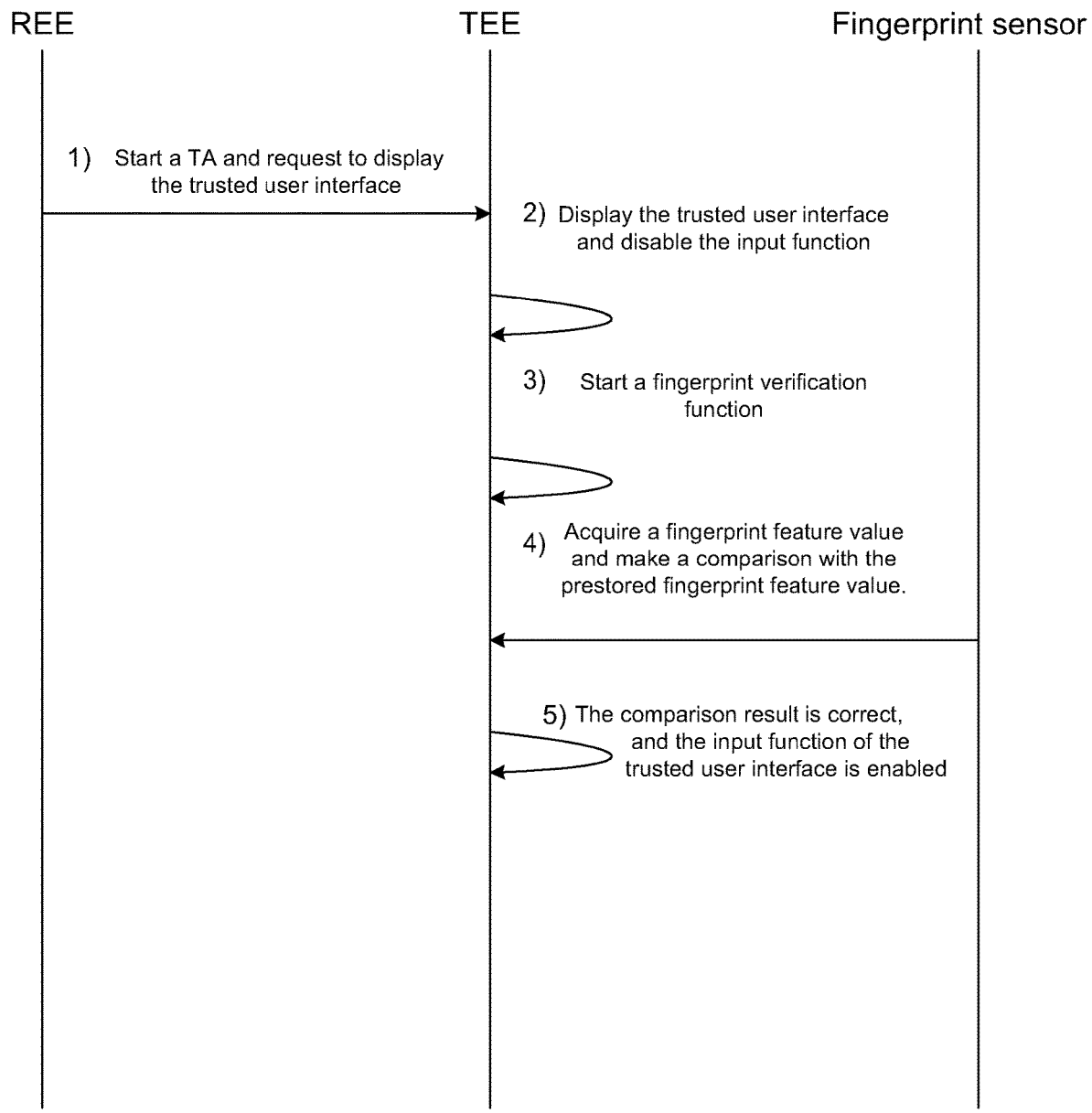
FIG. 6 is a flowchart illustrating an exemplary sequence of computer-implemented steps for performing a method for displaying a trusted user interface according to embodiments of the present invention.

With reference to FIG. 6, a flowchart depicting an exemplary interactive process using REE and TEE execution environments based on a TrustZone security extension mechanism is illustrated according to embodiments of the present invention. At step 1, the Client APP on the REE side starts the TA and requests to display the trusted user interface. At step 2, the TA on the TEE side displays the trusted user interface, where the input function is disabled on the trusted user interface. At step 3, the TA on the TEE side starts the fingerprint verification function. At step 4, the TA on the TEE side detects the finger press on the fingerprint sensor, acquires the fingerprint feature value, and compares the fingerprint feature value with the pre-stored fingerprint feature value. At step 5, the comparison result is determined to be correct, and the input function of the trusted user interface is enabled and/or activated. When it is verified to the user that the displayed user interface is a true and trustworthy TUI, the user may then input key information (e.g., password, etc) without danger of a malicious program displaying a false interface.

Accordingly, embodiments of the present invention provide verification for user interfaces using an existing fingerprint sensor of a smart terminal device without increasing hardware costs. In other embodiments, adaptive modifications may be made based on the systems and methods described herein. For example, when the trusted user interface does not display an input function because it is disabled, after a finger press at the fingerprint sensor is detected, and the comparison is successfully made, the trusted user interface is displayed. When the fingerprint verification function is started, an animation that indicates that the verification has started may be presented to the user. Furthermore, the hardware device may use another hardware device configured to acquire external information, such as a photographic device.

Figure 7:
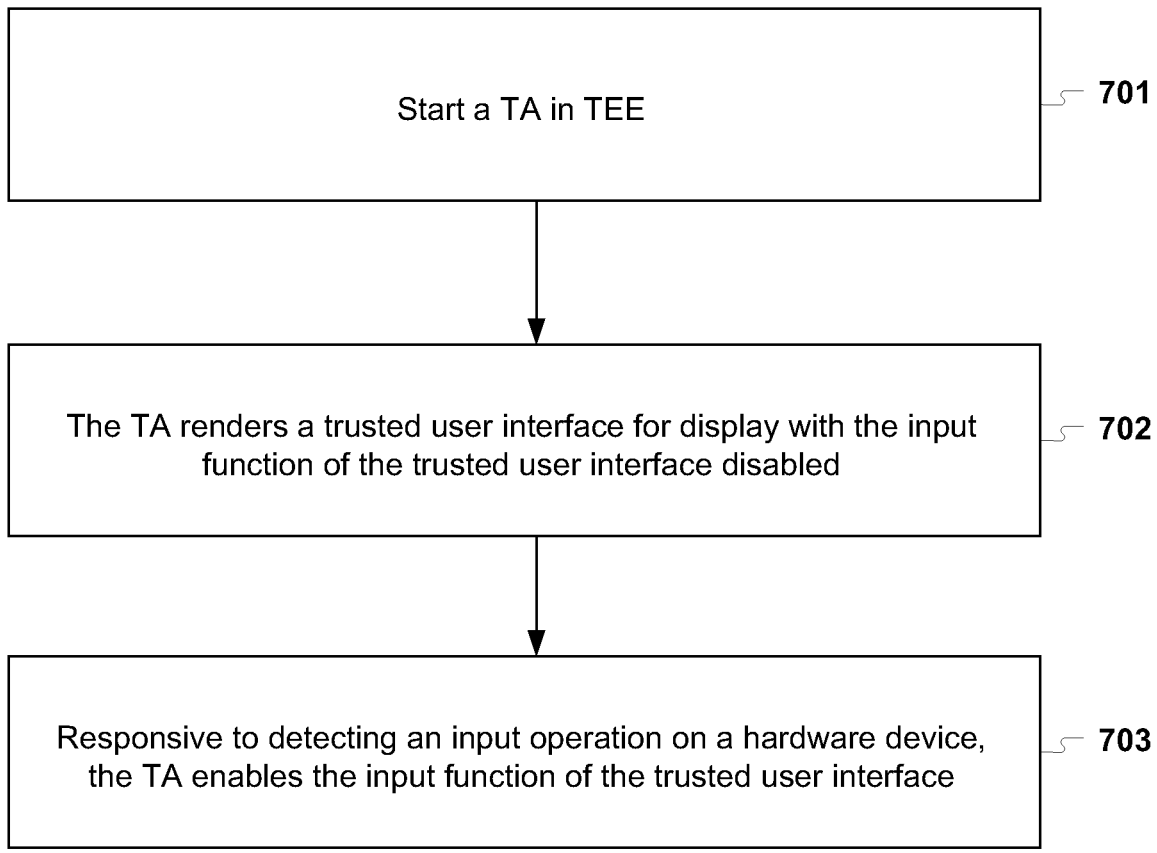
FIG. 7 illustrates a process of displaying a user interface according to another embodiment of the present disclosure.

Thus, TA can also display a trusted user interface before detecting a press operation from the finger sensor. At this time, as it has not been verified that the user interface is true and trustworthy, the input function of the trusted user interface can be disabled. The present disclosure provides another method of displaying a user interface as shown in FIG. 7, FIG. 7 illustrates an exemplary process of displaying a user interface according to another embodiment of the present disclosure.

At 701, a trusted application is initiated in the trusted execution environment.

At 702, the trusted application renders the trusted user interface for display and disables the input function of the trusted user interface.

The trusted user interface can be a key information input interface, such as a PIN input interface. Since at this time it has not been verified to the user that the trusted user interface is true and trustworthy, the input function of the trusted use interface can be disabled while the trusted user interface is being displayed. More specifically, if the trusted user interface is configured to receive user input of the key information through a touch screen, such as an account number, passwords, and etc., the touch input function of the touch screen is disabled at this time. If the trusted user interface configured to receive user input of the key information through a keyboard, the input function of the keyboard is disabled at this time.

At step 703, once the trusted application detects an input operation from the hardware device, the input function of the trusted user interface is enabled.

Figure 8:
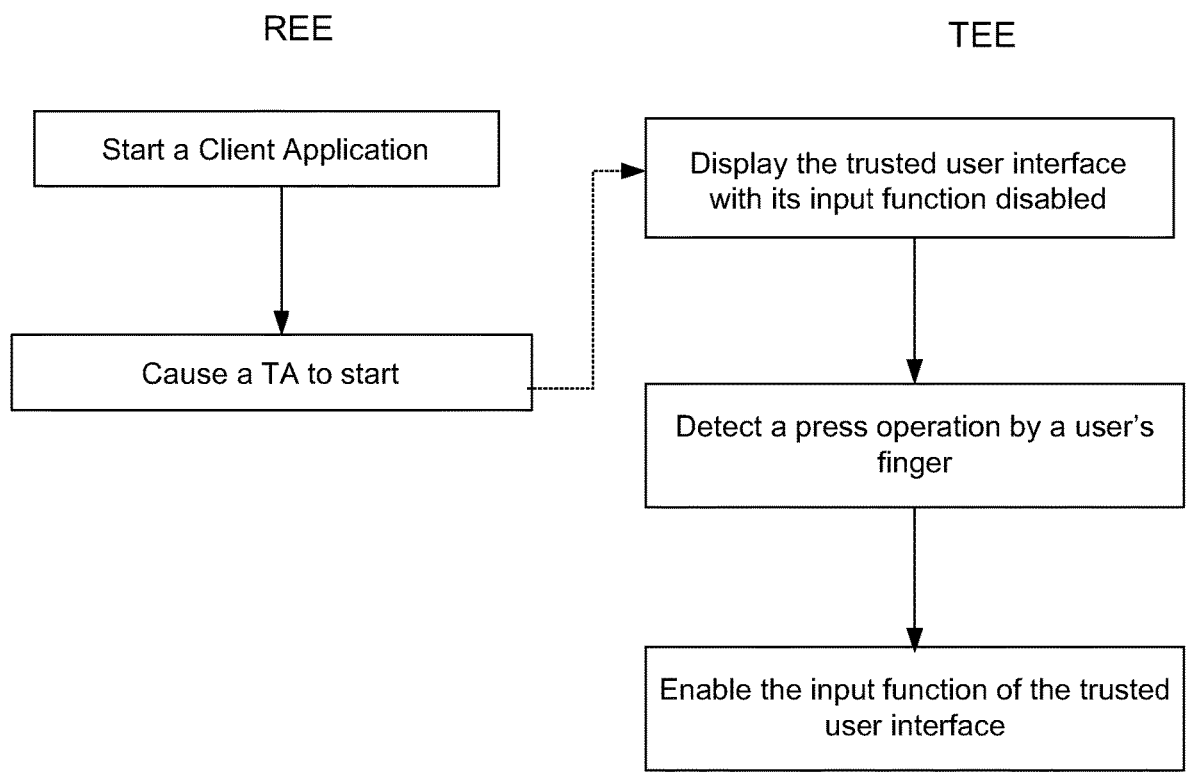
FIG. 8 is a flow chart depicts an exemplary process of displaying a user interface according to still another embodiment of the present disclosure.

The trusted application may enable the input function of the trusted user interface after detecting press operation by the user on the fingerprint sensor. FIG. 8 is a flow chart depicts an exemplary process of displaying a user interface according to another embodiment of the present disclosure. As shown, when the client application is initiated in the REE and the client application needs to execute certain functions with security, a trusted application including a trusted user interface is triggered. After the TA is initiated in the TEE, the trusted user interface is rendered for display with the input functions disabled. After the fingerprint sensor detects a press operation by the user, the input function of the trusted user interface is enabled, such that the user can provide through the trusted user interface by using a touch screen, a keyboard or any other peripheral device.

Figure 9:
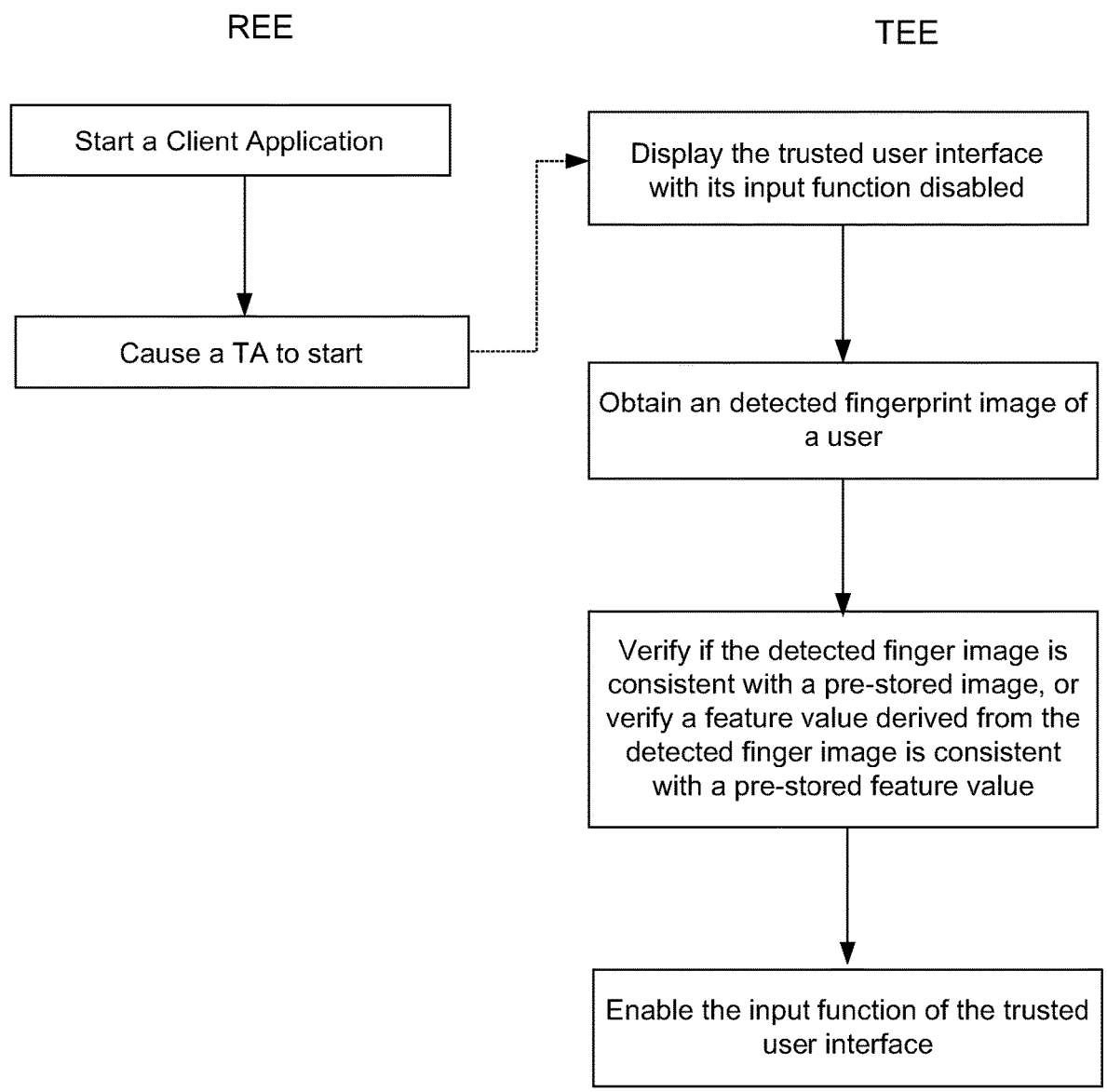
FIG. 9 is a flow chart depicts an exemplary process of displaying a user interface according to still another embodiment of the present disclosure.

FIG. 9 is a flow chart depicts an exemplary process of displaying a user interface according to still another embodiment of the present disclosure. As shown, once TA detects a press operation on the fingerprint sensor, TA can further determine if an image of the detected fingerprint is consistent with a pre-stored image of a fingerprint. Alternatively, it can determine if a feature value derived from the detected fingerprint is consistent with a pre-stored feature value of a fingerprint. If consistent, the input function of the trusted user interface can be enabled. In this manner, it can both verify that the user interface is a true and trustworthy TUI and authenticate the identification of the TUI user, advantageously providing enhanced security.

The embodiments described above utilize a fingerprint sensor as an input device. In some other embodiments, the trusted application can enable the input function of a trusted user interface responsive to detecting an operation on other types of input devices. For example, the trusted application can enable the input function of the trusted user interface after the photographic device captures the iris or face image. Alternatively, the input function of the trusted user interface is enabled after verifying that the image or the feature value of a detected iris and/or face is consistent with a stored image or feature value of an iris and/face.

According to the present disclosure, the trusted application initially displays a trusted user interface with its input function disabled. The input function can be later enabled after detecting an input operation on a hardware device that is configured to run in a TEE and obtain external information. Therefore, the present disclosure utilizes a trusted hardware device to verify that a user interface is true and trustworthy without introducing hardware cost or complicated software implementation. Once it is verified, the input function of the user interface is enabled, allowing a user to provide input through a secure and safe interface.

Figure 10:
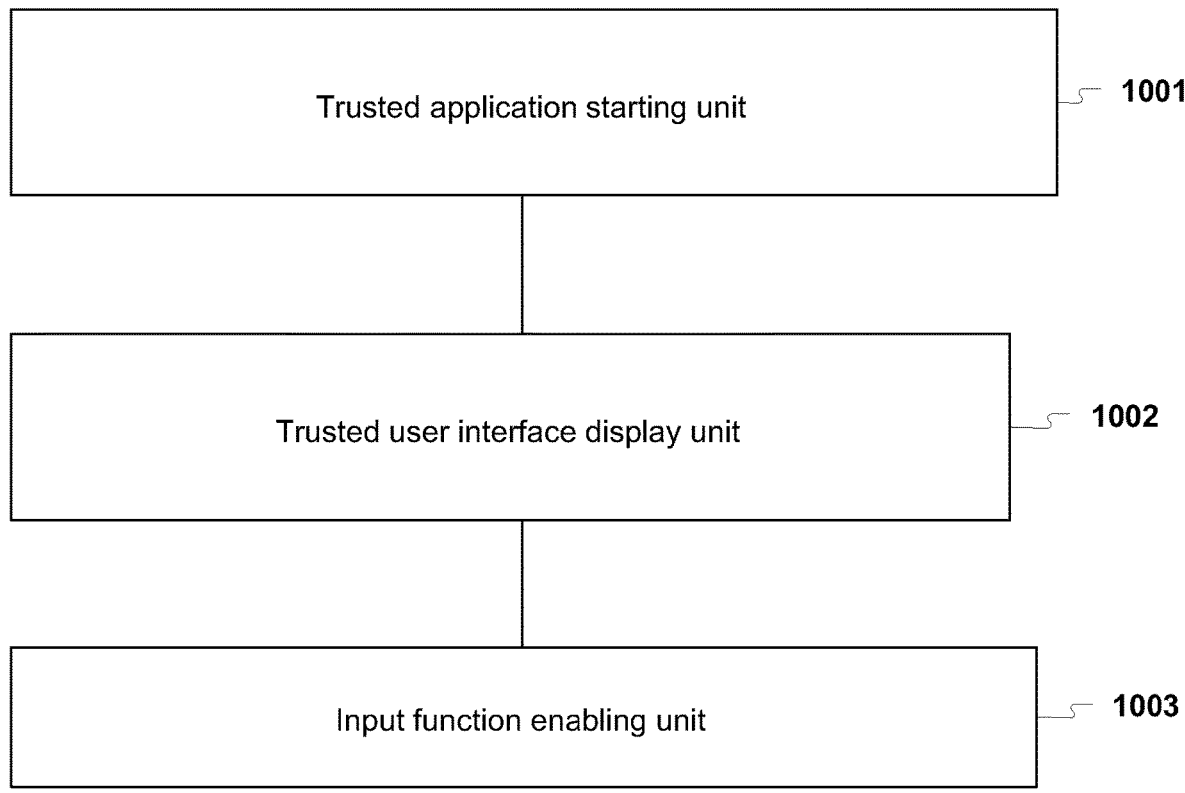
FIG. 10 is a block diagram illustrating the configuration of an exemplary display system for displaying a user interface according to an embodiment of the present disclosure.

FIG. 10 is a block diagram illustrating the configuration of an exemplary system for displaying a user interface according to an embodiment of the present disclosure. The system is configured to perform the functions as described in the exemplary processes of displaying a user interface. The system includes a trusted application start unit 1001, a trusted user interface display unit 1002, and an input function enabling unit 1003. The trusted application start unit 1001 is configured to start the trusted application in a TEE and can be used to perform the process as in step 701. The trusted user interface display unit 1002 is configured to display the trusted user interface in the trusted application, disable the input function of the trusted user interface, and can be used to perform the process as in step 702. The input function enable unit 1003 is configured to enable the input function of the trusted user interface after an input operation on a hardware device is detected. The unit 1003 can be used to perform the process as in step 703.

The input function enabling unit 1003 includes an input operation detection sub-unit and an enable execution sub-unit. The input operation detection sub-unit can be used for the trusted application to detect an input operation through the hardware device. The enable execution sub-unit can be used to enable the input function of the trusted user interface after the input operation detection sub-unit detects an input operation on the hardware device.

In some embodiments that use a fingerprint sensor to collect external information, the trusted application uses the input operation detection sub-unit to detect a press operation on the fingerprint sensor. The input operation detection sub-unit can perform the process related to detection of a press operation on a fingerprint sensor as described in greater detail above with reference to Step 803.

In some embodiments, the input function enabling unit further includes a fingerprint comparison sub-unit which is, responsive to the input operation detection unit detecting an press operation on the fingerprint sensor, used by the trusted application to determine if the image or feature value of a detected fingerprint is consistent with a pre-stored fingerprint image or feature value. If consistent, the fingerprint comparison sub-unit causes the input function enabling sub-unit to enable the input function. The fingerprint comparison sub-unit can perform the process related to comparison of fingerprint image or feature value as described in greater detail above with reference to Step 703.

In some embodiments that use a photographic device to collect external information, the input operation detection sub-unit is used to acquire the image of an iris or face captured by the photographic device. The input operation detection sub-unit can perform the process related to acquisition of an image of an iris or face captured by a photographic device as described in greater detail above with reference to Step 703.

In some embodiments, the input function enabling unit further includes an iris or face comparison sub-unit which is used by the trusted application to determine if the image or feature value of the detected iris or face is consistent with the image or feature value of a pre-store detected iris or face. If consistent, the iris or face comparison sub-unit causes the enabling sub-unit to enable the input function. The iris or face comparison sub-unit can perform the process related to comparing the image or feature value of a captured iris or face with a pre-stored iris or face image or feature value as described in greater detail above with reference to Step 703.

Although the present application is disclosed above with reference to the preferred embodiments, the embodiments are not intended to limit the present application. Various variations and modifications may be made without departing from the spirit and scope of the present application. Therefore, the scope of the present application shall be subjected to the scope defined by the claims of the present application.

In a typical configuration, a computing device comprises one or more central processing units (CPUs), input/output (I/O) interfaces, network interfaces, and memories. The memory may include such computer-readable mediums as a volatile memory, a random-access memory (RAM), and/or other forms of nonvolatile memories, such as a read-only memory (ROM) or a flash memory (flash RAM). An example of the computer-readable medium is the memory.

The computer-readable mediums include permanent and non-permanent mediums and removable and non-removable mediums, which may implement information storage by using any method or technology. The information may be computer-readable instructions, data structures, program modules, or other data. Examples of computer storage mediums include, but are not limited to a phase-change random-access memory (PRAM), a static random-access memory (SRAM), a dynamic random-access memory (DRAM), other types of random-access memories (RAMs), a read-only memory (ROM), an electrically erasable programmable read-only memory (EEPROM), a flash memory or other memory technologies, compact disc read-only memory (CD-ROM), a digital versatile disk (DVD) or other optical storage devices, a magnetic cassette, a magnetic tape, magnetic disk storage device, or other magnetic storage devices, or any other non-transmission mediums which may be used to store information that can be accessed by a computing device. According to the definition in this specification, the computer-readable medium does not include a transitory computer-readable medium, such as modulated data signals and carriers.

Those skilled in the art shall understand that the embodiments of the present application may be described as illustrating methods, systems, or computer program products. Therefore, hardware embodiments, software embodiments, or hardware-plus-software embodiments may be used to illustrate the present application. In addition, the present application may further employ a computer program product which may be implemented by one or more non-transitory computer-readable storage mediums with a computer executable program code stored thereon. The non-transitory computer-readable storage mediums comprise, but are not limited to, a disk memory, a CD-ROM, and an optical memory.

What is claimed:

1. A method for generating a secure display, the method comprising:
    executing a client application in a normal environment of a processor;
    outputting a verification request by the client application; and
    initiating a trusted application in a secure environment of the processor in response to the verification request, an input device being accessible to the client application executing in the normal environment before the trusted application starts executing in the secure environment, inaccessible to the client application executing in the normal environment after the trusted application has started executing in the secure environment, and accessible to the trusted application after the trusted application has started executing in the secure environment, the trusted application to:
        output a trusted user interface for capturing first identity verification information from a user, the trusted user interface having an unblocked display function that outputs information to a display device, and a blocked input function that prevents an input device from accepting user input;
        capture second identity verification information from the user while the input device is accessible to the trusted application and inaccessible to the client application after the trusted user interface has been output; and unblock the input device to accept user input and capture the first identity verification information from the user after capturing the second identity verification information.

2. The method of claim 1, wherein the trusted application to further:
compare the second identity verification information to pre-stored information; and
unblock the input device to accept user input and capture the first identity verification information from the user when the second identity verification information and the pre-stored information are determined to be a match.

3. The method of claim 1, wherein the first identity verification information includes a personal identification number (PIN), and the second identity verification information is a fingerprint image, a fingerprint feature value, or an iris image, and the pre-stored information is a pre-stored fingerprint image, a pre-stored fingerprint feature value, or a pre-stored image that includes an iris, respectively.

4. The method of claim 1, wherein the normal environment is executed on a first virtual core, and the secure environment is executed on a second virtual core.

5. An apparatus for generating a secure display, the apparatus comprising:
an input device;
a processor coupled to the input device, the processor having a normal environment and a secure environment, the processor to:
execute a client application in the normal environment, and a trusted application in a secure environment
the trusted application to:
output a trusted user interface for capturing first identity verification information from a user, the trusted user interface having an unblocked display function that outputs information to a display device, and a blocked input function that blocks reception of information from an input device;
capture second identity verification information from the user while the input device is accessible to the trusted application and inaccessible to the client application after the trusted user interface has been output; and
unblock reception of information from the input device to capture the first identity verification information from the user after capturing the second identity verification information.

6. The apparatus of claim 5, wherein the trusted application to further:
compare the second identity verification information to pre-stored information; and
unblock reception of information from the input device to capture the first identity verification information from the user when the second identity verification information and the pre-stored information are determined to be a match.

7. The apparatus of claim 5, wherein the first identity verification information includes a personal identification number (PIN), and second identity verification information is a fingerprint image, a fingerprint feature value, or an iris image, and the pre-stored information is a pre-stored fingerprint image, a pre-stored fingerprint feature value, or a pre-stored iris image, respectively.

8. An apparatus for generating a secure display, the apparatus comprising:
a display device;
an input device;
a processor coupled to the display device and the input device, the processor having a normal environment and a secure environment, the normal environment being executed on a first virtual core, and the secure environment being executed on a second virtual core, the processor to:
execute a client application in the normal environment, and output a verification request by the client application; and
initiate a trusted application in the secure environment in response to the verification request, the input device being accessible to the client application executing in the normal environment before the trusted application starts executing in the secure environment, inaccessible to the client application executing in the normal environment after the trusted application has started executing in the secure environment, and accessible to the trusted application after the trusted application has started executing in the secure environment, the trusted application to:
capture user identity verification information while the input device is accessible to the trusted application and inaccessible to the client application;
output a trusted user interface for capturing alternate identity verification information from the user after capturing the user identity verification information;
compare the user identity verification information to pre-stored information; and
remove the trusted user interface when the user identity verification information and the pre-stored information are determined not to be a match.

9. The apparatus of claim 8, wherein the user identity verification information is a fingerprint image, a fingerprint feature value, or an iris image, and the pre-stored first identity information is a pre-stored fingerprint image, a pre-stored fingerprint feature value, or a pre-stored iris image, respectively.

10. The apparatus of claim 8, wherein the alternate identity verification information includes a personal identification number (PIN).

11. A non-transitory computer-readable storage medium having embedded therein program instructions, which when executed by one or more processors of a device, causes the device to execute a process that generates a secure display, the process comprising:
executing a client application in a normal environment of a processor;
outputting a verification request by the client application; and
initiating a trusted application in a secure environment of the processor in response to the verification request, an input device being accessible to the client application executing in the normal environment before the trusted application starts executing in the secure environment, inaccessible to the client application executing in the normal environment after the trusted application has started executing in the secure environment, and accessible to the trusted application after the trusted application has started executing in the secure environment, the trusted application to:
output a trusted user interface for capturing first identity verification information from a user, the trusted user interface having an unblocked display function that outputs information to a display device, and a blocked input function that blocks reception of information from an input device;

capture second identity verification information from the user while the input device is accessible to the trusted application and inaccessible to the client application after the trusted user interface has been output; and unblock reception of information from the input device to capture the first identity verification information from the user after capturing the second identity verification information.

12. The medium of claim 11, wherein the second identity verification information is a fingerprint image, a fingerprint feature value, or an iris image, and the pre-stored first identity information is a pre-stored fingerprint image, a pre-stored fingerprint feature value, or a pre-stored iris image, respectively.

13. The medium of claim 11, wherein the first identity verification information includes a personal identification number (PIN).

14. A non-transitory computer-readable storage medium having embedded therein program instructions, which when executed by one or more processors of a device, causes the device to execute a process that generates a secure display, the process comprising:

executing a client application in a normal environment of a processor;

outputting a verification request by the client application; and initiating a trusted application in a secure environment of the processor in response to the verification request, an input device being accessible to the client application executing in the normal environment before the trusted application starts executing in the secure environment, inaccessible to the client application executing in the normal environment after the trusted application has started executing in the secure environment, and accessible to the trusted application after the trusted application has started executing in the secure environment, the trusted application to:

capture user identity verification information while the input device is accessible to the trusted application and inaccessible to the client application;

output a trusted user interface for capturing alternate identity verification information from the user after capturing the user identity verification information;

compare the user identity verification information to pre-stored information; and remove the trusted user interface when the user identity verification information and the pre-stored information are determined not to be a match.

15. The medium of claim 14, wherein:

the user identity verification information is a fingerprint image, a fingerprint feature value, or an iris image, and the pre-stored first identity information is a pre-stored fingerprint image, a pre-stored fingerprint feature value, or a pre-stored iris image, respectively; and the alternate identity verification information includes a personal identification number (PIN).

16. The medium of claim 14, wherein the normal environment is executed on a first virtual core, and the secure environment is executed on a second virtual core.

* * * * *